May 5, 1942.        L. G. LARSEN        2,281,774
SLOTTING MACHINE
Filed Nov. 14, 1938        3 Sheets-Sheet 1
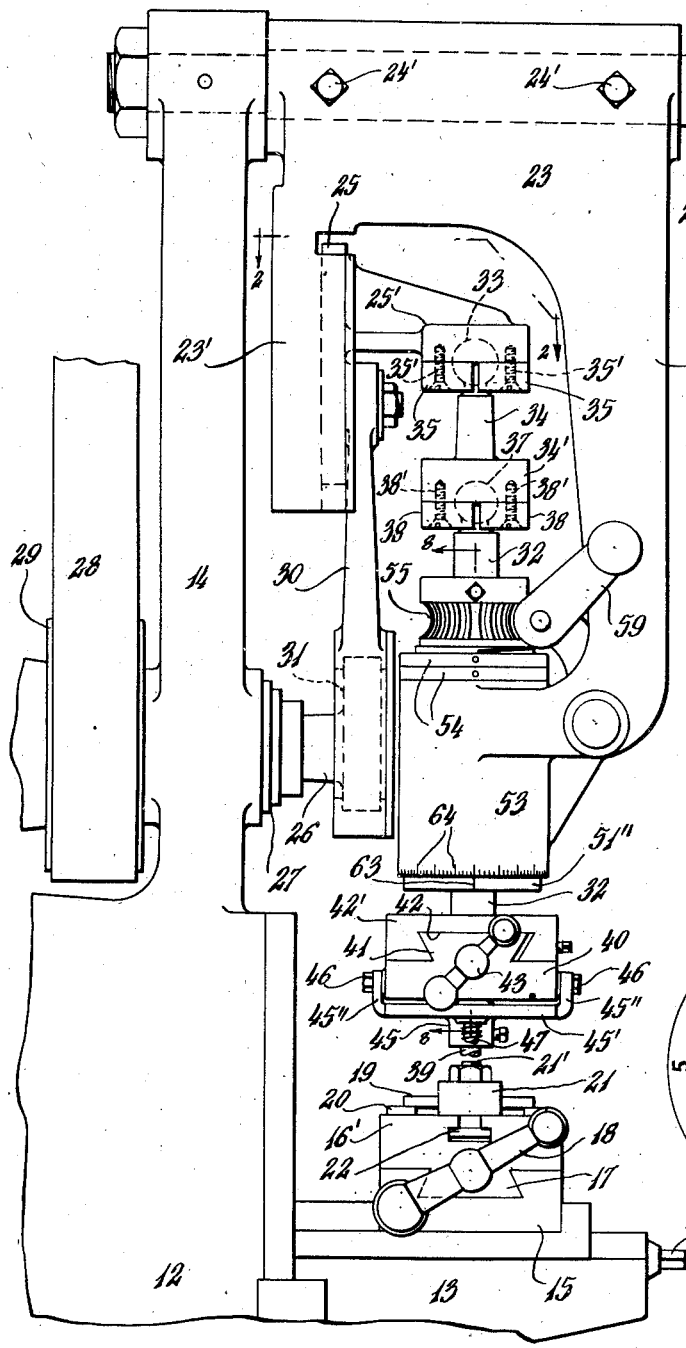
INVENTOR
Louis G. Larsen
BY John O. Seipt
ATTORNEY May 5, 1942.　　　L. G. LARSEN　　　2,281,774
SLOTTING MACHINE
Filed Nov. 14, 1938　　　3 Sheets-Sheet 2
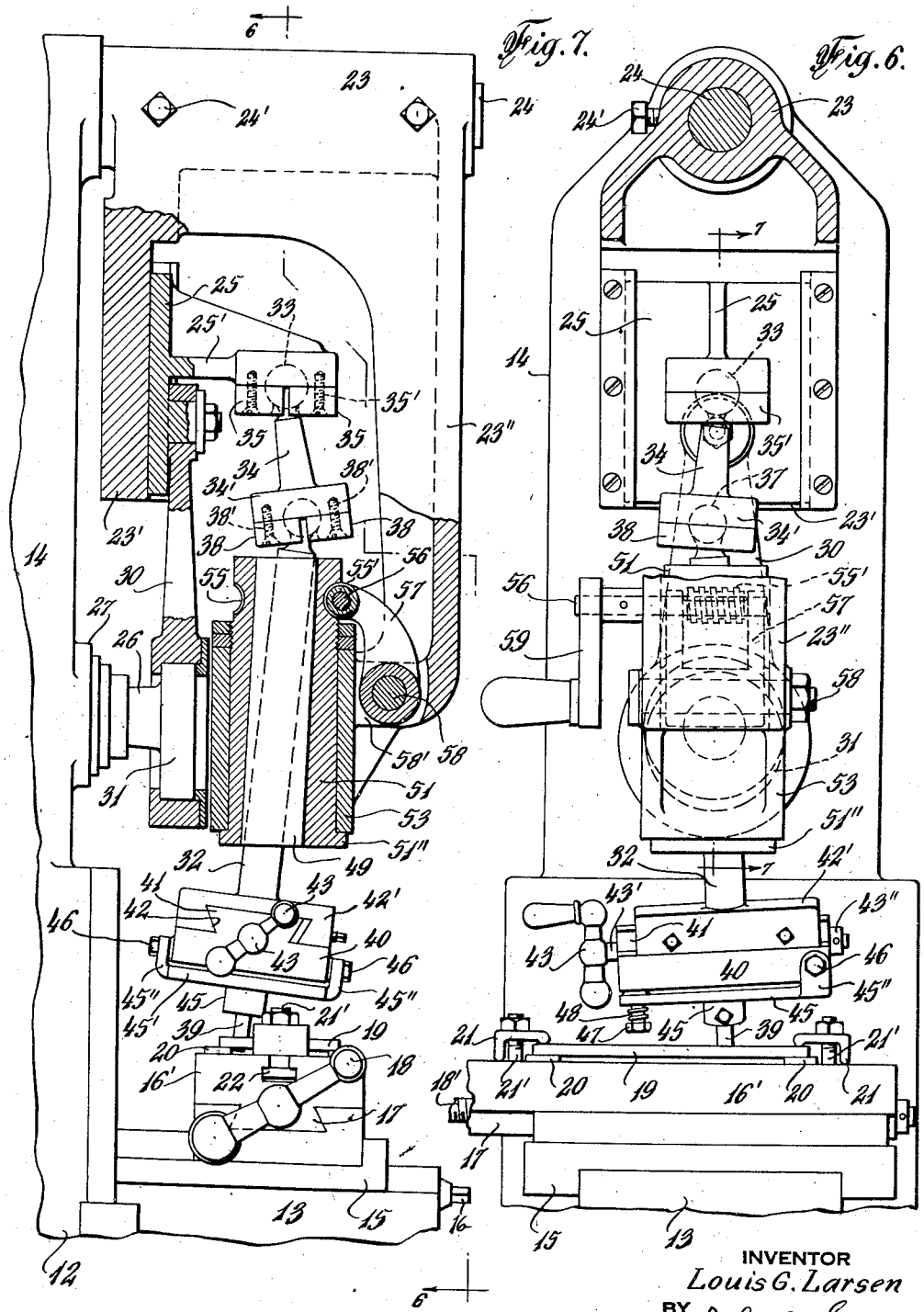
INVENTOR
*Louis G. Larsen*
BY *John O. Seifert*
ATTORNEY

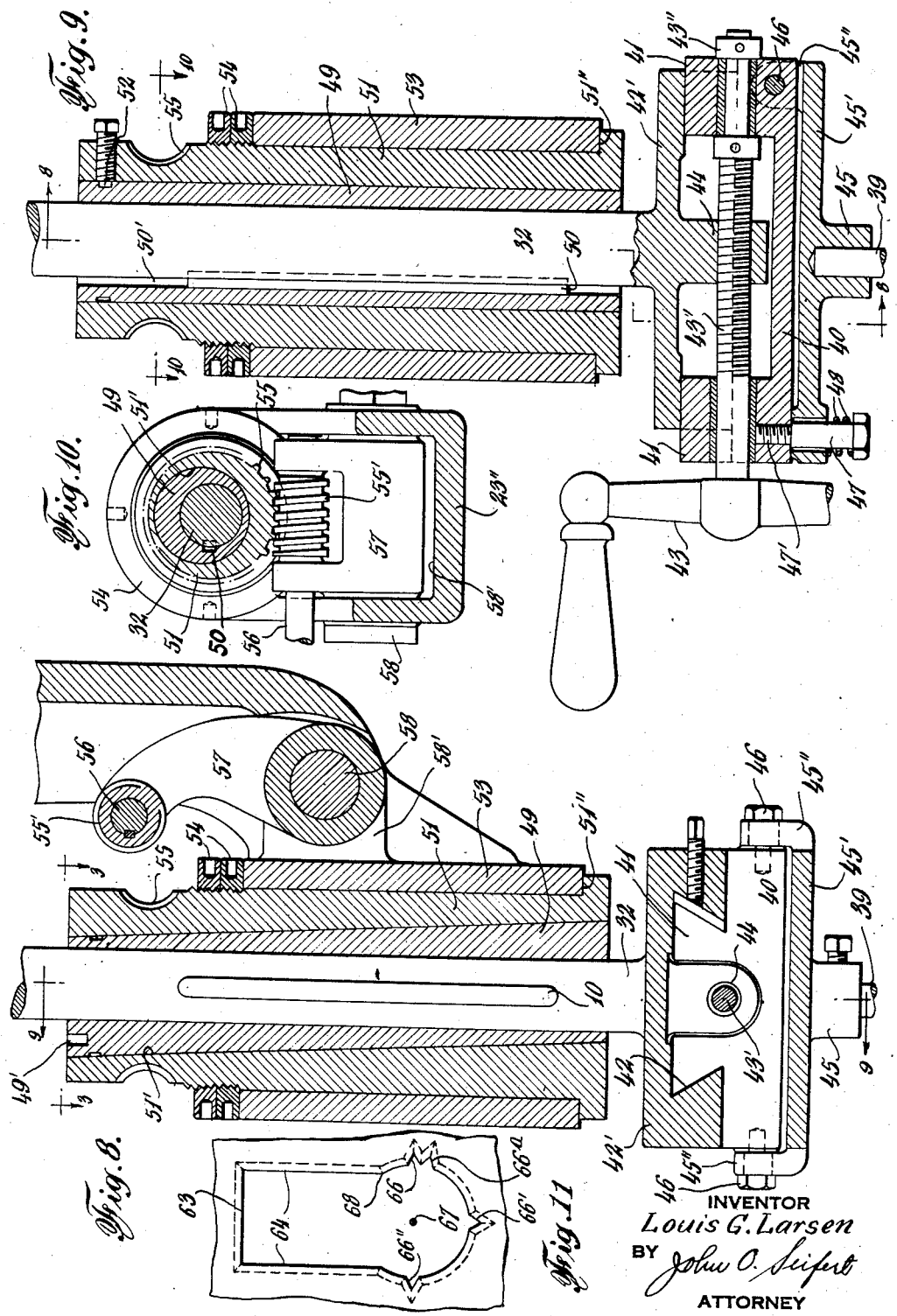

Patented May 5, 1942

2,281,774

UNITED STATES PATENT OFFICE 2,281,774

SLOTTING MACHINE

Louis G. Larsen, Jersey City, N. J., assignor, by direct and mesne assignments, to Wirthsen Associates, Inc., New York, N. Y., a corporation of New York Application November 14, 1938, Serial No. 240,272

11 Claims. (Cl. 90—44)

This invention relates to slotting machines and while the invention is not limited to any particular use, it is especially adapted for slotting metal plates or blocks to form blanking dies and produce finished dies without requiring any hand work to finish the dies.

It is the primary object of the invention to provide an improved machine for slotting plates to form blanking dies, which is capable of forming slots of rectangular or other form with the edges cut at an angle to the face of the die to provide clearance when it is used as a stamping die, and to cut out corners at the juncture of two angular portions of a slot wall, and thus eliminate the necessity of forming said portions of the slot wall by hand, and to provide a machine of this character that is simple in construction and efficient in use.

In machines of this character a carrier for a tool to cut the slot in a die plate is reciprocated toward and away from the work, such as a plate or block, on a work support, and in order to provide clearance when the die constitutes a blanking die the wall of the slot or opening in the plate or die is undercut by cutting the slot wall at an oblique angle to the face of the plate or die. For this purpose the tool as the tool carrier is moved toward the plate or block on the work support, is caused to move simultaneously progressively laterally and thus produce a cut at an angle to the face of the plate.

It is another object of the invention to provide in a machine of this character adjustable means for the tool carrier to cause the tool carrier with the tool in one position of adjustment thereof to be reciprocated perpendicular to the work support, or cause the tool carrier to reciprocate at variable oblique angles relative to the work support and the tool simultaneously caused to move progressively laterally relative to the work to produce diagonal cuts and vary the angle of cut of the tool, and to effect angular adjustment of the tool carrier with the tool about the axis of the tool carrier to change the direction of movement of the tool carrier and tool to cut out the corners at the juncture of angular wall portions of the slot or at the juncture of arcuate and angular wall portions of the slot, cut irregular wall portions of the slot and cut recesses laterally into the arcuate or angular wall portions of the slot in the die plate.

It is a further object of the invention to provide in a machine of this character a reciprocatory tool carrying post having a tool holder mounted thereon to have adjustment transversely of the axis of the post and to provide means slidably engaged by the post and rotatably adjustable with the post and about the post to guide and cause the post to reciprocate perpendicular to the work support and at different oblique angles to the work support and cause the tool to move progressively laterally and produce cuts diagonally to the face of the die plate and vary the angle of cut of the tool as well as change the direction of movement of the post and tool holder and angle of cut of the tool.

Other objects and advantages of the invention will hereinafter appear.

In the drawings accompanying and forming a part of this application,

Figure 1 is a side elevation of a machine showing an embodiment of means for carrying out the invention and having a portion of the supporting base broken away.

Figure 2 is a cross sectional view taken on the line 2—2 of Figure 1.

Figure 3 is a view looking at the top of Figure 8.

Figure 4 is a perspective view of a die blank, partly broken away, to show a form of slot or opening adapted to be formed by the machine therein.

Figure 5 is a sectional view taken on the line 5—5 of Figure 4.

Figure 6 is a front elevation, partly in section, taken on the line 6—6 of Figure 7.

Figure 7 is a sectional view taken on the line 7—7 of Figure 6.

Figure 8 is a longitudinal sectional view, on an enlarged scale, taken on the line 8—8 of Figure 1.

Figure 8 is a longitudinal sectional view, on an enlarged scale, taken on the line 8—8 of Figure 1.

Figure 9 is a longitudinal sectional view taken on the line 9—9 of Figure 8.

Figure 10 is a cross sectional view taken on the line 10—10 of Figure 9; and

Figure 11 is a plan view of another die blank showing another form of slot or opening adapted to be cut in the plate by the machine.

In the embodiment of the machine for carrying out the invention illustrated in the drawings only so much of the structure of the machine is shown as is essential to an understanding of the invention, and comprises a supporting base 12 arranged with a horizontal table 13 and a standard 14 extended upwardly from the base at the rear of the table 13. A conventional form of support for the work, such as a plate or block for forming a die, is adjustably mounted on the table 13, and comprises a block 15 mounted in a slideway in the table and effected by means of a crank applied to the end of a lead screw 16 rotatably mounted in the table 13 and having threaded connection with the block 15 (not shown). A slide 16' has a dovetail connection 17 with the block to have sliding movement transversely of the block and in a direction at right angles to the movement of the block on the table, the slide being adjusted by a crank 18 connected to a lead screw 18' rotatably carried by the block and having screw threaded connection with the slide 16'. The work, such as a plate or block 19, is secured to the top of the slide 16' relative to gauges 20 by clamping members 21 engaging the top of the slide and over marginal portions of the work and clamping the work to the slide by bolts 21' the heads of which slidably engage in inverted T slots in the top of the slide, as at 22, the bolts being extended through openings in the clamping members and the clamping members being caused to clamp the work to the slots by nuts threaded onto the bolts at the outer side of the clamping members.

A yoke shaped supporting bracket 23 for carrying the operative parts of the machine is suspended above the work support by an arbor 24 engaging in an opening in the top of and fixed to the standard 14, and extended through an opening in the leg connecting portion of the bracket, and the bracket fixed to said arbor by set screws 24'. One leg 23' of said bracket is disposed adjacent and in parallel relation to the standard 14 and is of less length than the other leg 23'' and arranged with a slideway in the inner face extending perpendicular to the work support. A slide or head 25 having a laterally extending arm 25' is slidably mounted in said slideway and is reciprocated therein from a shaft 26 journaled in a bearing 27 in the standard 14, the shaft being operatively connected to and driven from a suitable source of power (not shown) by a belt 28 passing around a pulley 29 fixed on said shaft. The head 25 is operatively connected to the shaft by a rod 30 pivotally connected at one end to the head and operatively connected at the opposite end to an eccentric, as at 31, fixed on the shaft 26.

A post 32 is connected to the head 25 to be reciprocated longitudinally thereby perpendicular and at different or varying oblique angles relative to the work support and to permit of rotative movement of the post. For this purpose the slide arm 25' is provided with a rectangular enlargement at the end having an under flat face with a semi-spherical recess therein adapted for the engagement, as at 33, of a globular member at the end of a rod 34, and said globular member retained in said recess and the rod connected to the arm by a pair of blocks 35 secured to the under flat face of the arm enlargement by screws 35', the blocks having arcuate recesses in the mating faces to engage the globular member at the end of the rod and thus connect the rod to the slide arm 25'. The rod 34 has a rectangular head 34' at the opposite end having a spherical recess in the end axially of the rod for the engagement of a globular member, as at 37, at the end of the post 32, and retained in operative connection therewith by blocks 38 secured to the rod head by screws 38' with arcuate recesses in said blocks engaging the globular member on the post.

A tool 39 is carried by the post at the lower end thereof through a tool holder, shown as a slide 40 having a central dovetail projection 41 at the opposite ends to slidably engage a corresponding recess or slideway 42 extending transversely of the end of a head 42' secured to or integral with the end of the post, the slide being adapted to be adjusted transversely of the post by a crank 43 connected to the end of a lead screw 43' rotatable in the dovetail projections 41 of the slide 40, the end of the screw opposite the crank being reduced in diameter providing a shoulder to abut the inner side of one dovetail projection to hold the screw against longitudinal movement in one direction relative to the slide and having a collar 43'' secured on the end of the screw extended from said dovetail projection to hold the screw against longitudinal movement in the opposite direction relative to the slide. The screw 43' has threaded connection, as at 44, with a projection extended downwardly from the head 42' centrally of the slideway and midway the ends of the head and axially of the post 32. It will be obvious that by rotating the screw in one direction by the crank 43 the slide 40 will be moved in one direction and by rotating the screw in the opposite direction the slide will be adjusted in the opposite direction. The tool 39 is secured in a boss 45 projecting downwardly centrally from a plate 45' having ears 45'' at one end and the opposite sides extending at a right angle from the plate in a direction opposite to the tool engaging boss 45 and whereby the plate is pivotally connected to the slide 40 by screws 46. The plate is supported to extend relative to the slide and urged in a direction toward the slide and to have yielding movement away from the slide during the relieving movement of the tool, by a headed stud 47 slidably extended through an opening centrally in the plate at the end opposite the pivotal support thereof and having a reduced threaded end portion for threaded connection with an opening in the slide, as at 47', with a spring 48 coiled about and interposed between the head of the stud and the outer side of the plate, as shown in Figures 6 and 9.

To cause the tool 39 as it is reciprocated with the post 32 to pass through the die plate and produce cuts at a right angle to the face of the plate, or cause the tool as it passes through the die plate to move progressively laterally and produce diagonal cuts, vary the extent of said lateral movement of the tool to vary the angle of cut of the tool, and change the direction of said lateral movement of the tool, means are provided to cause the tool carrying post 32 to be longitudinally reciprocated perpendicular and at different oblique angles relative to the work and have rotative adjustment about its axis. For this purpose the post is extended through a sleeve 49 of uniform outside diameter and the bore of which extends through the sleeve at an angle to the axis thereof, the post being adapted to have longitudinal sliding movement relative to the sleeve and rotate with the sleeve by a key 50 fixed in the post slidably engaging a keyway 50' in the sleeve. The sleeve 49 is mounted in a second sleeve 51 of uniform outside diameter and the bore 51' extending through the sleeve at an angle to the axis of the sleeve and at the same angle as the bore in the sleeve 49.

The outer sleeve 51 is rotatably mounted in a tubular member 53 of less length than the sleeves at the extremity of a portion of the leg 23'' of the bracket 23 extended at a right angle in a direction toward the bracket leg 23', said tubular portion being positioned above the work support and with the axis extending parallelly of the slideway in the bracket leg 23'. To mount the sleeve 51 in the tubular member 53 the lower end of the sleeve has an annular enlargement to provide it with an annular shoulder, as at 51'', to abut the lower end of the tubular member 53. The sleeve 51 within the opposite or upper end has an external screw thread with a pair of collars 54 threaded thereon, the lower collar being adapted to engage and support the sleeve upon the end of the tubular member 53, and the other collar serving as a lock nut to retain the lower collar in position on the sleeve, the collars having sockets in the peripheral wall for the engagement of a pin wrench to turn the collars onto and off from the sleeve. The inner sleeve 49 with the post and the outer sleeve 51 are adapted to have rotative movement one independent of the other, and the inner sleeve 49 with the post is adapted to be locked to the outer sleeve 51 to rotate therewith by a set screw, as shown at 52, engaging an annular recess in the sleeve 49, in Figure 9, and also holding the sleeve 49 against longitudinal movement relative to sleeve 51.

The bore in said sleeves 49 and 51, as stated, inclines at the same angle to the axis of the sleeves and may be arranged at any desired angle to the axis of the sleeve. For illustrative purposes it is inclined at 2½ degrees relative to the axis of the sleeve. By this arrangement and the rotative adjustment of the inner sleeve 49 with the tool carrying post relative to the outer sleeve 51 the post may be set to move longitudinally perpendicular to the work support and cause the tool to produce cuts at a right angle to the face of the die plate 19, or the tool carrying post may be set to move longitudinally at different oblique angles relative to the work support of from 1 to 5 degrees to the perpendicular and cause the tool to produce angular or undercuts of from 1 to 5 degrees relative to the face of the die plate, as shown at 19' in Figure 5, and which will provide sufficient clearance when the plate is adapted to form a blanking die. To effect this adjustment in the angularity of the tool carrying post 32 relative to the work support the sleeve 49 with the tool carrying post 32 is rotatably adjusted in the sleeve 51 through an arc of 180 degrees and set the post to incline at any angle from 1 to 5 degrees relative to the work support. and index means is provided to indicate the position of the tool carrying post comprising graduations on the upper end of the sleeve 51 numbered 1 to 5 from opposite sides of zero, the zero indication being disposed relative to the wall portion of the sleeve 51 of greatest thickness and the five indication disposed diametrically opposite or 180 degrees from the zero indication.

The end of the sleeve 49 (Figure 3) is provided with an indicator line 49ª extending transversely of the wall portion of said sleeve of least thickness and is adapted to be placed in register with any one of the graduation numbers 0 to 5, to indicate the angle at which the tool carrying post is reciprocated.

To facilitate the rotative adjustment of the sleeve 49 with the post relative to the sleeve 51 it is provided with sockets 49' in the upper end (Figure 3) for the application of a pin wrench. To hold the outer sleeve 51 against rotation with sleeve 49 and also to effect rotative adjustment of the sleeve 51 independent of and with the sleeve 49, it is arranged with a worm 55 in the portion projecting above the tubular member 53. A worm wheel 55' meshing with said worm 55 is adapted to rotate the sleeve 51, said worm wheel being fixed on a shaft 56 within a bifurcation of an arm 57 pivotally supported on a stud 58 extending transversely of an opening 58' in the bracket leg 23'' at the juncture thereof with the tubular member 53. To throw the worm wheel into and out of mesh with the worm 54 and rotate the worm wheel, a crank 59 is fixed to one end of the worm carrying shaft projecting through a side of the worm wheel carrying arm 57. It will be obvious that when the worm wheel is moved out of mesh with the worm that the sleeve 51 may be readily rotated by hand.

In the operation of the machine the work 19 is clamped to the work supporting slide 16' and said slide and its supporting block 15 is adjusted to the desired position relative to the axis of the tubular member 51. Should it be desired to cause the tool to produce cuts at a right angle to the face of the plate, the sleeve 49 with the tool carrying post 32 is rotatably adjusted relative to the sleeve 51 to register the indicator line 49ª on the sleeve 49 with the zero indication on the sleeve 51, and in which position of adjustment of the sleeves the parts will be in the position shown in Figures 8 and 9, and the tool carrying post with the tool holder and tool will be reciprocated in a plane perpendicular to the work on the work support. Should it be desired to undercut or arrange the wall of the slot in the die plate diagonally to the face thereof and thus provide a clearance, the sleeve 49 with the tool carrying post is rotatably adjusted in the sleeve 51 to either side of the zero graduation to register the indicator line with any one of the graduation numbers one to five, depending upon the desired angle of the slot wall, and shown in Figure 7 wherein the parts are shown in the limit of their adjustment. This rotative adjustment of the tool carrying post is permissible due to the ball sockets or universal joint connection between the tool carrying post and the rod 34. After the sleeve 49 with the tool carrying post has been adjusted to produce the desired angle of cut by the tool the sleeve 49 is locked to the sleeve 51 by the set screw 52.

Assuming it is desired to cut a slot in the die plate conforming to the shape as shown in Figure 4 wherein the slot has opposite parallel side wall portions 60, 61 arranged at right angles to the end wall portions 60', and the opposite side walls are arranged with intermediate arcuate wall portions 62, 62', and the slot undercut at an angle of 5 degrees. The sleeve 49 with the tool carrying post is first rotatably adjusted relative to the sleeve 51 to register the indicator line 49ª with the graduation indicated by 5, when the sleeves are locked together by the set screw 52. Assuming it is desired to first cut the wall portion 60 and the die plate is mounted on the work support to extend longitudinally thereof and the wall portion 60 to be cut is at the rear of the work support. The work support is first adjusted to position the work within the center in line with the axis of the tubular member 53, then the sleeve 51 with the sleeve 49 locked thereto is rotatably adjusted to cause the tool carrying post to incline rearwardly relative to the work support, as shown in Figure 7. In this position of the parts the tool carrying post with the tool holder and tool are reciprocated and as the tool passes through the work or die plate it is caused to move progressively laterally relative to the work producing cuts at an angle of 5 degrees. As stated, this lateral movement of the tool and the angle of cut of the tool may be varied from 1 to 5 degrees, depending upon the rotative adjustment of the sleeve 49 with the tool carrying post relative to the sleeve 51. As the cutting of the slot wall progresses the work support is adjusted longitudinally and at a right angle to the cutting movements of the tool until the slot wall 60 of the desired length has been cut. The corner at the juncture of the slot wall 60 with an end wall 61 is then cut, which is effected by rotatably adjusting the sleeve 51 with the sleeve 49 and tool carrying post through an angle 45 degrees by rotating the worm wheel 55 by the crank 59 and suitable means is provided for indicating this adjustment and may be indicated by the position of an indicator line 63 on the sleeve 51 relative to graduations 64 on the tubular member 53. In this position of adjustment the tool carrying post is reciprocated cutting the corner with the wall inclining at the same angle as the wall portion 60. After the corner has been cut the sleeve 51 is rotatably adjusted through a further angle of 45 degrees whereupon by the reciprocation of the tool with the tool carrying post the end wall portion 61 is cut. Preferably, after the side wall 60 or 60' of the slot has been cut the sleeve 51 is rotatably adjusted through an arc of 180 degrees and the other side wall portion of the slot is cut, and after which the end wall portions of the slot are cut. After the wall portions 60, 60', 61 of the slot have been cut and forming a substantially rectangular opening or slot in the plate, the arcuate portions 62, 62' are cut in the side wall portions 60, 60'. Assuming said wall portions 62, 62' are in the arc of a circle and located midway the ends of the wall portions 60, 60' and that the wall portion 62 is to be cut first. The tool carrying post 32 is adjusted to the position shown in Figure 7, with the tool holder carrying slide 40 positioned at a right angle to the position shown in said figure. The work carrying slide 16 is then adjusted to position the work so that the tool is midway the ends of the slot in the work or plate and said slide adjusted rearwardly to position so that the center of the tubular member 53 will be in line with the center of the arc of the wall portion 62 to be cut when the sleeve 51 with the sleeve 49 and tool carrying post is rotatably adjusted by the rotation of the crank 59 to position the tool relative to the wall portion 60 to constitute the corner at the juncture of the arcuate wall portion with said wall portion 60. As the tool reciprocates and the cutting of the wall portion 62 progresses the tool is moved in an arc of a circle relative to the direction of cutting movement of the tool by rotatably adjusting the sleeve 51 by rotating the worm wheel by the crank 59. To cut the arcuate wall portion 62' the sleeve 51 is rotated through an angle of 180 degrees to cause the tool carrying post to incline oppositely to the position shown in Figure 7 when the operation of cutting the arcuate wall portion 62' is proceeded with in the manner described in connection with cutting the wall portion 62.

To arrange a die plate with an opening or slot as shown in Figure 11 having angular wall portions 63, 64 and 64', the arcuate wall portion 65 at one end of the slot, and said arcuate wall portion arranged with notches or recesses 66, 66', 66" equidistantly or irregularly spaced about said wall portion with the slot wall undercut at an angle of 5 degrees, the wall portions 63 and 64, 64' are first cut in the manner of cutting the wall portions 60, 60' and 61 of the opening or slot in the work or die plate shown in Figure 4. The slot or opening is also preferably provided first with an end portion similar to and at the end of the wall opposite the wall portion 63 and thus providing the work or plate with a rectangular slot or opening. The slot is then arranged with the arcuate portion 65'. For this purpose the work supporting slide 16 is adjusted to position the longitudinal center of the slot in the plate in line with the axis of the tubular member 53. The tool holding slide 40 is then adjusted to position whereby it may be adjusted angular to the center of the tubular member 53 by the rotation of the sleeve 51 to circumscribe a circle having a radius not greater than half the width of the rectangular wall portion. As the tool is reciprocated through the work or die plate the tool carrying post and thereby the tool is rotatably adjusted to and fro transversely to the direction of cutting movement of the tool by rotation of the sleeve 51 through rotation of the worm wheel 55, and as successive arcuate portions are cut away the work supporting slide 16 is adjusted longitudinally of the work. As the work is positioned at a point constituting the center of the arcuate wall portion 65, as indicated by the dot 67, the tool holding slide 40 is actuated to adjust the tool laterally of the center of the tool carrying post a distance less than the radius of the arcuate portion 65. The sleeve 53 with the tool 44 and tool carrying post is adjusted or indexed so that the tool will be positioned whereby by the reciprocation of the tool it will cut one of the corners 68 at the juncture of the arcuate wall portion with a side wall portion 64 or 64'. As the tool reciprocates it is moved in a circular path transverse to the direction of reciprocation of the tool by rotating the sleeve 51 through the worm wheel 55 and upon completion of cutting an arcuate portion the slide 40 is adjusted to position the tool farther radially outward until the tool is positioned laterally of the center of the tool carrying post a distance equal to the radius of the arcuate portion 65.

Upon completion of cutting the arcuate wall portion 65 of the slot the radial notches or recesses 66, 66' and 66" are cut in said wall, which recesses as shown are spaced 90 degrees or equal distances apart, although they may be spaced irregular distances apart. The recess 66 is cut first. For this purpose the sleeve 51 is indexed by the rotation of the worm wheel 55 to position the tool to reciprocate in a plane to cut the recess 66. Upon completing the cutting of recess 66 the sleeve 51 is indexed by the rotation of the worm wheel 55 to successively cut the recesses 66' and 66". To cut successive and contiguous recesses, as 66ª, in the arcuate wall portion 65 the sleeve 51 and thereby the tool is angularly adjusted upon cutting the one recess, as the recess 66, a distance equal to the pitch line between said recesses. While said recesses are shown as of acute angle form in cross section they may be of any other desired cross sectional form. In cutting said recesses as the tool is reciprocated it is moved radially outward by the adjustment of the slide 40 until the recesses are cut to the desired step.

By the arrangement of the flexible means for coupling the tool carrying post to the head 25 the tool carrying post is maintained in operative connection with the head 25 in all positions and is adapted to transmit the movements of the head to the tool carrying post. By the arrangement of mounting the worm wheel 55 on the arm 57 the worm wheel may be thrown out of mesh with the worm on the sleeve 51 to permit of quick adjustment of said sleeve by hand, and when the worm wheel is in mesh with the worm it will be held against rotative movement in either direction and permit of fine adjustment of said sleeve 51. Also by the arrangement of the bores in the sleeves 49, 51 at an angle to the axis of said sleeves, and the rotative adjustment of the sleeve 49 with the tool carrying post relative to the sleeve 51 the lateral movement of the tool during the reciprocation of the tool carrying post and the angle of cut of the tool may be varied, and it will be obvious that the means for producing this result is simple and cheap in construction and highly efficient in use.

It will be obvious that various modifications may be made in the construction and arrangement of the parts without departing from the scope of the invention.

Having described my invention, I claim:

1. In a slotting machine including a work support, a tubular member supported in fixed position above the work support with the bore thereof extending perpendicular to the work support, a tool carrying post extending through said member, means connected to and operative to move said post longitudinally to and away from the work support, a sleeve mounted in the bore of said tubular member having the bore inclined relative to the axis of the sleeve, a second sleeve in the bore of the first sleeve having the bore inclined relative to the axis of the sleeve and slidably engaged by and rotatable with the tool carrying post in the first sleeve, and said second sleeve with the tool carrying post adapted to be rotatably adjusted in the first sleeve and in one position of adjustment guide the tool carrying post with the tool to have movement in a plane perpendicular to the work support and in other positions of adjustment thereof guide the tool carrying post to move at different oblique angles relative to the work support and cause the tool to produce cuts diagonally of the work and vary the angle of cut of the tool.

2. A slotting machine as claimed in claim 1, wherein the first sleeve is adapted to be rotatably adjusted with the second sleeve and tool carrying post to change the direction of movement of the tool carrying post relative to the work and the direction of angle of cut of the tool.

3. A slotting machine as claimed in claim 1, wherein the bores in the sleeves incline at the same angle relative to the axis of the respective sleeves.

4. In a slotting machine as claimed in claim 1, means to releasably connect the first sleeve to the second sleeve, and means to rotatably adjust the connected sleeves and tool carrying post in the tubular member to change the direction of movement of the tool carrying post to and from the work on the work support and the direction of angle of cut of the tool.

5. In a slotting machine as claimed in claim 1, means to releasably connect the first sleeve to the second sleeve, and means to rotatably adjust the connected sleeves and tool carrying post in the tubular member to change the direction of movement of the tool carrying post to and from the work on the work support and the direction of angle of cut of the tool, comprising a worm on the first sleeve, a worm wheel to mesh with the worm, and a crank connected to the worm to rotate the same.

6. In a slotting machine as claimed in claim 1, means to releasably connect the first sleeve to the second sleeve, and means to rotatably adjust the connected sleeves and tool carrying post in the tubular member to change the direction of movement of the tool carrying post to and from the work on the work support and the direction of angle of cut of the tool, comprising a worm on the sleeve, a worm wheel, a pivoted bracket carrying the worm wheel operative to move worm wheel into and out of mesh with the worm, and a crank to rotate the worm wheel.

7. In a slotting machine as claimed in claim 1, means to flexibly connect the tool carrying post to the means to move the post to and away from the work support and compensate for the different angular positions of the tool carrying post in the movement thereof to and from the work support.

8. In a machine tool including a work support, a tubular member supported in spaced relation and with the bore thereof disposed perpendicular to the work support, a sleeve mounted to have rotative adjustment in the tubular member and the bore of which sleeve is inclined relative to the axis of the sleeve, a second sleeve mounted to have rotative adjustment in the first sleeve and the bore of which sleeve is inclined relative to the axis thereof, means to lock the second sleeve to the first sleeve to participate in the rotative adjustment thereof, a tool carrying post slidable longitudinally in the second sleeve to and away from the work support and to participate in the rotative adjustment of said sleeve, said sleeves being adapted to be adjusted relative to each other to guide and cause the tool carrying post to move in a plane perpendicular to the work support, and said tool carrying post by the rotative adjustment of the second sleeve adapted to move at different angles oblique to the work support and by the rotative adjustment of the second sleeve with the first sleeve change the direction of movement of the tool carrying post relative to the work support, means to indicate the adjustment of the second sleeve relative to the first sleeve and adjustment of the first sleeve with the second sleeve, and means to move the tool carrying post to and away from the work support.

9. In a slotting machine, a work support, a head reciprocatory toward and away from said work support, a tool carrier flexibly connected to said head whereby said tool carrier is adapted to be suspended from the head to have rotative movement and extend in different planes relative to the work support and participate in the reciprocatory movement of the head, a fixed tubular member disposed between the head and work support, and a pair of sleeves of uniform outer diameter and having a bore inclining to the axis of the sleeves and one of said sleeves rotatably mounted in the other and the outer sleeve rotatably adjustable in said tubular member and through the bore of the inner of which sleeves the tool carrier slidably extends and connected thereto to participate in the rotative adjustment thereof, said sleeves being adapted to guide the tool carrier and cause the tool during the reciprocation thereof with the tool carrier to move perpendicular to the work support in one position of adjustment of said sleeves with the tool carrier in the tubular member and in other positions of adjustment thereof guiding and causing the tool during the reciprocation of the tool carrier to move progressively laterally of the work on the work support and produce cuts diagonally of the work and vary the extent of said lateral movement and angle of cut of the tool.

10. In a slotting machine, a work support, a head reciprocatory perpendicular to the work support, a tool carrying post connected to the head to be suspended from and participate in the reciprocatory movements of the head and have rotative adjustment and adjustment to different angular positions relative to the work support, sleeves of uniform outer diameter having bores inclined relative to the axis of the sleeves with one sleeve rotatably engaged in the bore of the other sleeve and the tool carrying post slidably engaging in the bore of and rotatable with the inner sleeve, said sleeves being adapted to be rotatably adjusted one relative to the other to dispose the inner sleeve with the axis of the bore exending perpendicular to the work support to guide and cause the tool carrying post to reciprocate with the tool in a plane perpendicular to the work support and produce cuts by the tool at right angles to the work in one position of adjustment thereof, and in other positions thereof guide and cause the tool carrying post with the tool to reciprocate at different angles oblique to the perpendicular relative to the work support and produce cuts by the tool at different angles diagonally of the work, means to releasably connect the sleeves to rotate in unison, and means to rotate the sleeves in unison to change the direction of movement of the tool carrying post and the angle of cut produced by the tool.

11. In a slotting machine, a work support, a head reciprocatory perpendicular to the work support, a tool carrying post having a universal joint connection with the head to adapt said post to have rotative adjustment about its axis and to extend from the head in different planes relative to the work support, a fixed tubular member disposed between the head and work support extending in a plane perpendicular to the work support, a sleeve mounted in and rotatably adjustable about the axis of said tubular member and the bore of which sleeve is inclined relative to axis of the sleeve, a second sleeve having a uniform outer diameter mounted in the bore of the first tube to have rotative adjustment and the bore of which sleeve is inclined relative to the axis thereof and at the same angle as the bore of the first sleeve and in the bore of which second sleeve the tool carrying post slidably engages, a key in said post engaging a keyway in the bore of said second sleeve whereby the post is adapted to be slidably guided and participate in the rotative adjustment of said second sleeve, and said sleeves by the rotative adjustment thereof one relative to the other are adapted to position the bore in the second tube to guide and cause the tool carrying post during the reciprocation thereof to move in a plane perpendicular to the work support and produce cuts at a right angle to the work in one position of adjustment of the sleeves and to cause the tool carrying post to move in planes oblique to the perpendicular relative to the work support and produce cuts diagonally of the work in other positions of adjustment of said sleeves, and means to secure the second sleeve to the first sleeve to participate in rotative adjustment thereof to change the direction of movement of the tool carrying post and the angle of cut produced by the tool.

LOUIS G. LARSEN.